United States Patent
Sakai

(10) Patent No.: US 7,005,780 B2
(45) Date of Patent: Feb. 28, 2006

(54) POWER SOURCE APPARATUS

(75) Inventor: Yasuhiro Sakai, Sagamihara (JP)

(73) Assignee: U.S.C. Corporation, Tokyo (JP)

( * ) Notice: Subject to any disclaimer, the term of this patent is extended or adjusted under 35 U.S.C. 154(b) by 136 days.

(21) Appl. No.: 10/489,100

(22) PCT Filed: Sep. 9, 2002

(86) PCT No.: PCT/JP02/09146

§ 371 (c)(1),
(2), (4) Date: Mar. 10, 2004

(87) PCT Pub. No.: WO03/025969

PCT Pub. Date: Mar. 27, 2003

(65) Prior Publication Data

US 2004/0251789 A1    Dec. 16, 2004

(30) Foreign Application Priority Data

Sep. 12, 2001    (JP) .............................. 2001-277194

(51) Int. Cl.
H02N 2/00    (2006.01)
(52) U.S. Cl. ...................................... 310/329; 310/319
(58) Field of Classification Search ................ 310/329, 310/339, 319; 318/116, 118; H02N 2/00; H01L 41/08
See application file for complete search history.

(56) References Cited

U.S. PATENT DOCUMENTS

| | | | | |
|---|---|---|---|---|
| 5,835,996 A | * | 11/1998 | Hashimoto et al. | 310/319 |
| 6,060,817 A | * | 5/2000 | Mullen et al. | 310/339 |
| 6,809,462 B1 | * | 10/2004 | Pelrine et al. | 310/319 |

FOREIGN PATENT DOCUMENTS

| | | |
|---|---|---|
| EP | 1 100 189 | 5/2001 |
| JP | 2-17490 | 5/1990 |
| JP | 08-168272 | 6/1996 |
| JP | 3074105 | 10/2000 |
| JP | 2001-145375 | 5/2001 |

* cited by examiner

*Primary Examiner*—Darren Schuberg
*Assistant Examiner*—Karen Addison
(74) *Attorney, Agent, or Firm*—Wenderoth, Lind & Ponack, L.L.P.

(57) ABSTRACT

This invention relates to a power source apparatus using piezoelectric elements.

A conventional power source apparatus using the piezoelectric element has an ability of generating less electricity, and therefore, has been applicable only to equipment which operates with low power consumption. To solve the problems of the conventional power source apparatus, the inventor has devised a "power source apparatus" and disclosed in Japanese Utility Model Registration No. 3074105. However, the devised power generating device has the Zener diode used as the trigger circuit determining the quantity of the charged electricity. Therefore, it is necessary to operate the trigger circuit all the time, consequently to use too much electricity to operate. The electrical power consumption therefor is unignorable compared with the electric energy generated by the piezoelectric element. The consumption of the unignorable quantity of electricity for monitoring the current with the Zener diode makes it impossible to charge a lot of electricity in the device. Thus, there has been room for further improvement in the devised power generating device used for electric power equipment having need of relatively high electricity.

In the light of the foregoing controversial points of the conventional power source apparatuses, the present invention has the aim of providing a power source apparatus using a piezoelectric element, which is capable of supplying sufficient electricity to an external device having need of relatively high electricity.

To attain the object described above according to the present invention, there is provided a power source apparatus comprising a power generating section for generating electricity by exerting a stress on piezoelectric elements, and a charging section for recharging therein with the electricity, which charging section includes a determination means for determining whether the quantity of charged electricity reaches a prescribed level according to the timing of generating electricity in the piezoelectric elements.

According to the apparatus, electricity is generated by exerting the stress on the piezoelectric elements and successively charged in the charging section, while increasing the quantity of charged electricity in the charging section. Only when the quantity of electricity charged in the charging section complies with the timing of power generation in the piezoelectric elements, i.e. the timing of increase of the quantity of charged electricity, a determination whether the quantity of charged electricity reaches the prescribed level is made. Thus, the desired determination of the charged electricity can be made intermittently with high efficiency according to the timing of increasing the charged electricity. As a result, more electricity can be charged without wasting of electricity for monitoring and determining the charged electricity.

10 Claims, 7 Drawing Sheets

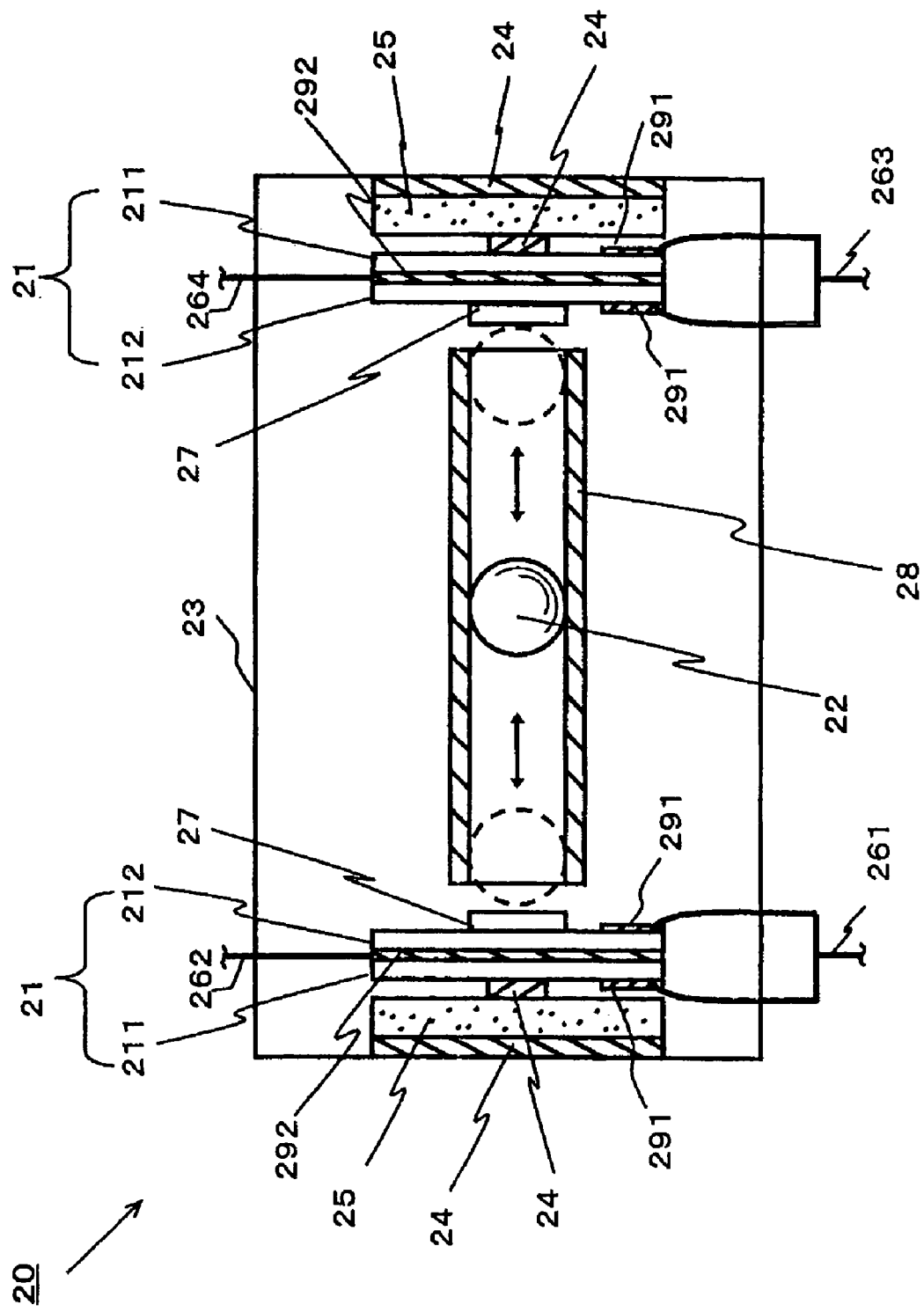

POWER SOURCE APPARATUS

TECHNICAL FIELD

This invention belongs to a technology relating to a power source apparatus using piezoelectric elements.

BACKGROUND ART

A technique for applying to a power source apparatus a piezoelectric element having a piezoelectric effect capable of converting mechanical energy into electric energy has been heretofore proposed. There have been known various inorganic and organic piezoelectric materials having the piezoelectric effect. Of these piezoelectric materials, a piezoelectric element formed of ceramic such as PZT piezoelectric material has attracted attention in the field and put to practical use.

However, since the conventional piezoelectric element is disadvantageously low in production of electricity, electrical energy generated by the piezoelectric lacks in practicality for a power generating system. Thus, the conventional piezoelectric element could be used for low-power consumption equipment.

To resolve such a problem of the conventional piezoelectric element, the inventor of the present invention has devised a "power generating device" as a power source apparatus using a piezoelectric element, as described in Japanese Utility Model Registration No. 3074105. The devised power generating device charges electric power generated by the piezoelectric element to a desired setting level and discharge the charged electric power in an instant when it reaches the setting level. The electric power energy discharged instantly can be applied for a great range of applications having need of relatively high electricity. In particular, the devised power generating device comprises a capacitor as a charging element, switching means for changing over the operating state to discharge, and a Zener diode serving as a trigger circuit connected to the switching means and capacitor. When the electricity charged in the capacitor exceeds the prescribed constant voltage of the Zener diode, the switching means is operated to discharge.

However, the devised power generating device has the Zener diode used as the trigger circuit determining the quantity of the electricity charged in the capacitor. Because the charged electricity in the capacitor is determined according to the voltage of direct current flowing into the capacitor, the direct current should be monitored constantly. Therefore, it is necessary to operate the trigger circuit all the time, consequently to use too much electricity to operate. The electrical power consumption therefor is unignorable compared with the electric energy generated by the piezoelectric element. The consumption of the unignorable quantity of electricity for monitoring the current with the Zener diode makes it impossible to charge a lot of electricity in the device. Thus, there has been room for further improvement in the devised power generating device used for electric power equipment having need of relatively high electricity.

In the light of the foregoing controversial points of the conventional power source apparatuses, the present invention has the following aims:

An object of the present invention is to provide a power source apparatus using a piezoelectric element, which is capable of supplying sufficient electricity to an external device having need of relatively high electricity.

Another object of the present invention is to provide a power source apparatus capable of charging more electricity without wasting energy for monitoring or determining charged electricity.

Still another object of the present invention is to provide a power source apparatus capable of generating a pseudo-alternating current for determining charged electricity.

DISCLOSURE OF THE INVENTION

To attain the objects described above according to the present invention, there is provided a power source apparatus comprising a power generating section for generating electricity by exerting a stress on piezoelectric elements, and a charging section for recharging therein with the electricity, which charging section includes a determination means for determining whether the quantity of charged electricity reaches a prescribed level according to the timing of generating electricity in the piezoelectric elements.

BRIEF DESCRIPTION OF THE DRAWINGS

FIG. 7 is a sectional view showing a generating section in a third embodiment of the present invention.

BEST MODE FOR CARRYING OUT AN INVENTION

Figure 1:
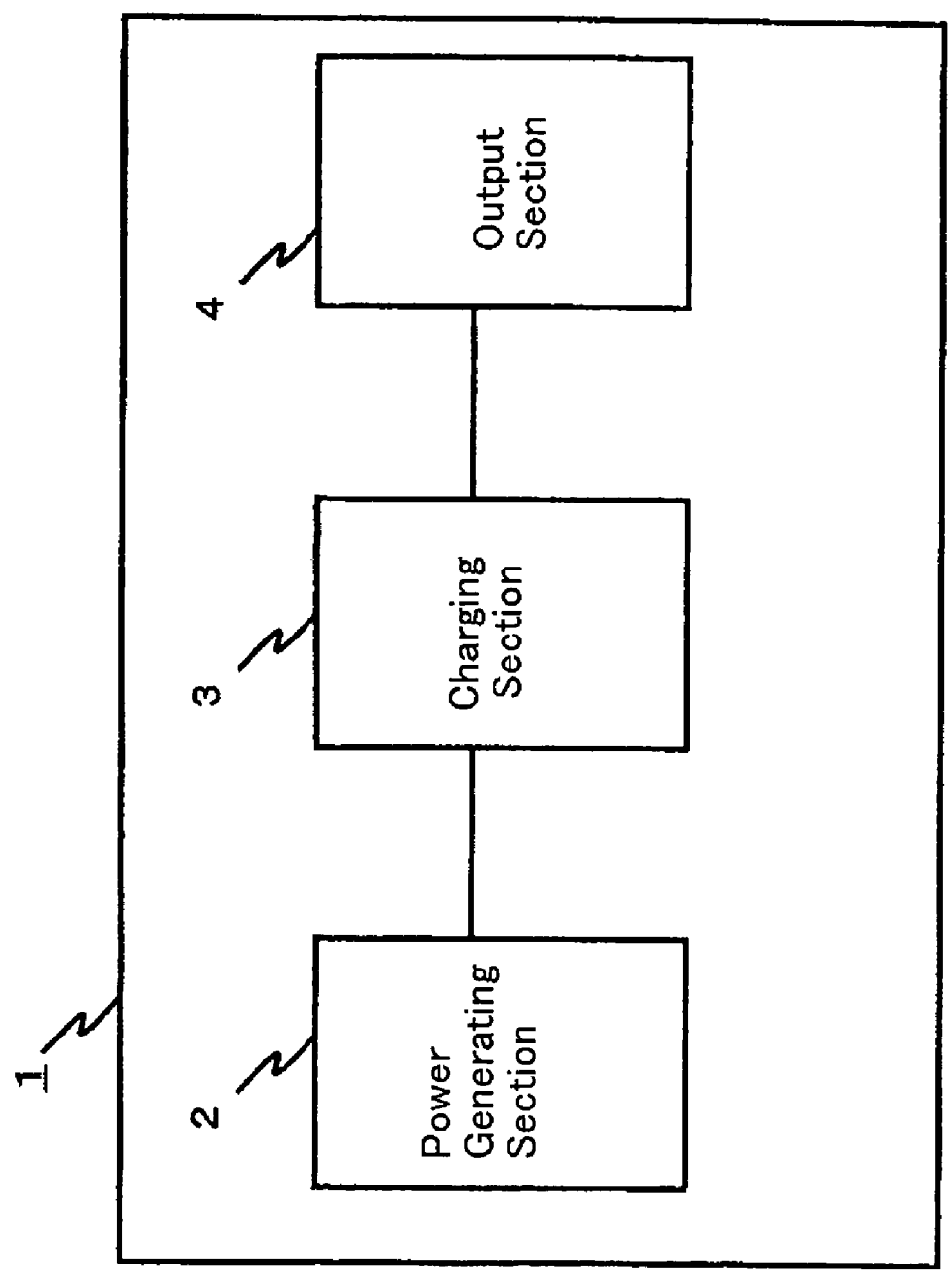
FIG. 1 is a block diagram showing a first embodiment of the present invention.

The power source apparatus according to the present invention comprises a power generating section for generating electricity by exerting a stress on piezoelectric elements, and a charging section for recharging therein with the electricity, which charging section includes a determination means for determining whether the quantity of charged electricity reaches a prescribed level according to the timing of generating electricity in the piezoelectric elements.

According to the apparatus, electricity is generated by exerting the stress on the piezoelectric elements and successively charged in the charging section, while increasing the quantity of charged electricity in the charging section. Only when the quantity of electricity charged in the charging section complies with the timing of power generation in the piezoelectric elements, i.e. the timing of increase of the quantity of charged electricity, a determination whether the quantity of charged electricity reaches the prescribed level is made.

The charging section also includes switching means for impeding discharging from starting until a determination whether the quantity of charged electricity reaches the prescribed level is made.

According to the switching means, the quantity of charged electricity, which increases every time the electric power is generated stepwise by the piezoelectric elements, is stored into the charging section without discharging until the quantity of charged electricity is determined to reach the prescribed level by the determination means.

The power generating section of the present invention is further provided with a collision member, which comes into collision with the piezoelectric elements. The determination means makes the determination whether the quantity of charged electricity reaches a prescribed level according to the timing of generating electricity in the piezoelectric elements.

According to the structure with the collision member, the quantity of charged electricity generated due to the strain in the piezoelectric element caused by bringing the collision member into collision with the piezoelectric element increases substantially stepwise. The, the determination whether the quantity of charged electricity reaches a prescribed level according to the timing of collision of the collision member with the piezoelectric element, i.e. the timing of increase of the quantity of charged electricity.

The determination means of the present invention performs the aforesaid determination by using alternating current output from the piezoelectric element in generation of electricity.

The determination means makes it possible to observe the quantity of charge in the charging section by use of the alternating current output from the piezoelectric element, which has a voltage proportional to the quantity of charge, and make an intermittent determination by use of the alternating current generated only when causing strain in the piezoelectric element (in the case of using the collision member, only when bringing the collision member into collision with the piezoelectric element).

Also, the determination means of the present invention makes the aforementioned determination by using alternating current generated in a pseudo-manner and having the voltage proportional to the quantity of charge in the charging section.

According to the determination means, a pseudo-AC voltage having a voltage proportional to the charged quantity is generated to fulfill the observation and intermittent determination.

An embodiment of the power source apparatus according to the present invention will be described hereinafter with reference to the accompanying drawings.

Figure 2:
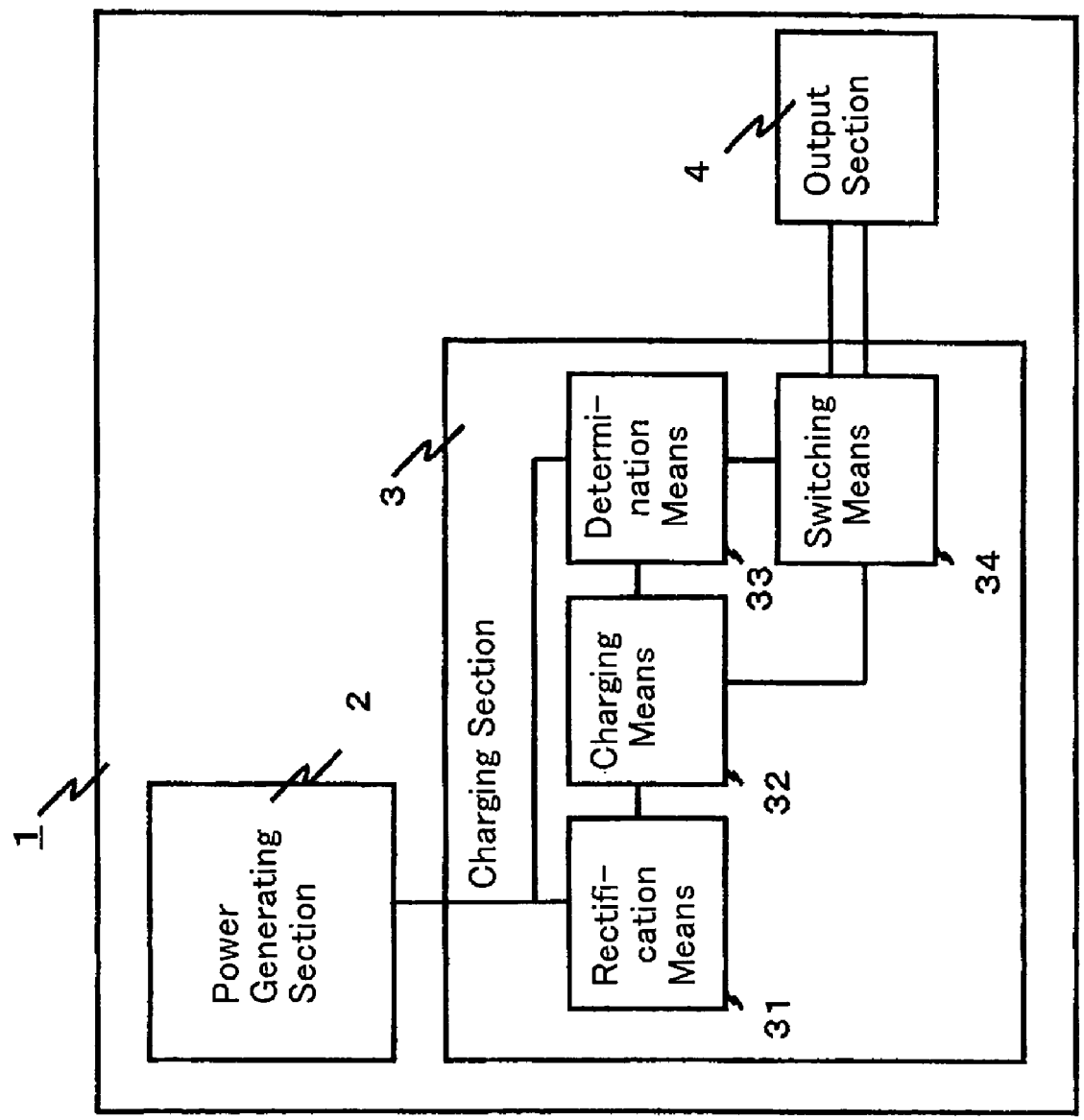
FIG. 2 is a block diagram showing in detail the first embodiment of the present invention.
Figure 3:
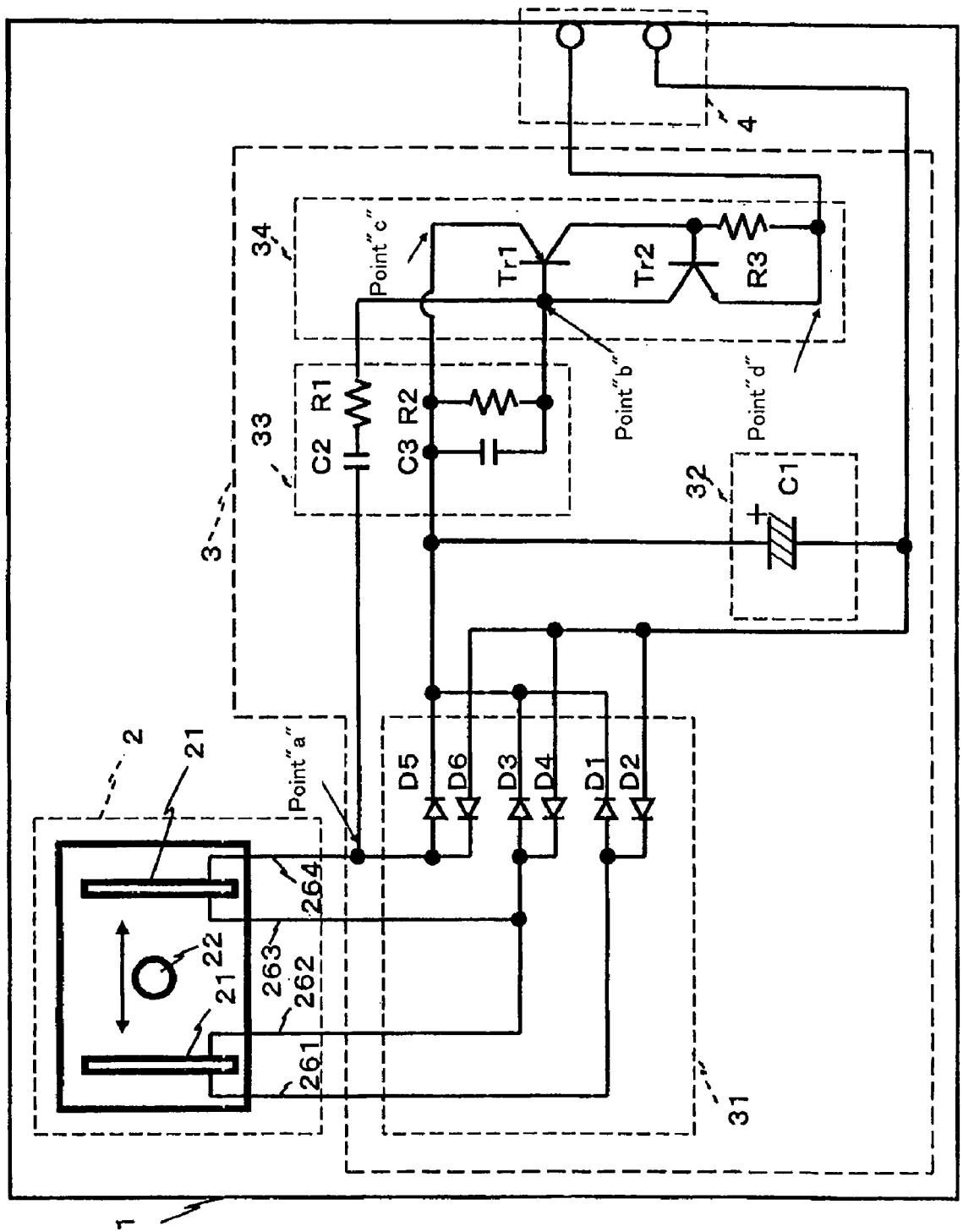
FIG. 3 is a circuit diagram of the first embodiment of the present invention.
Figure 4:
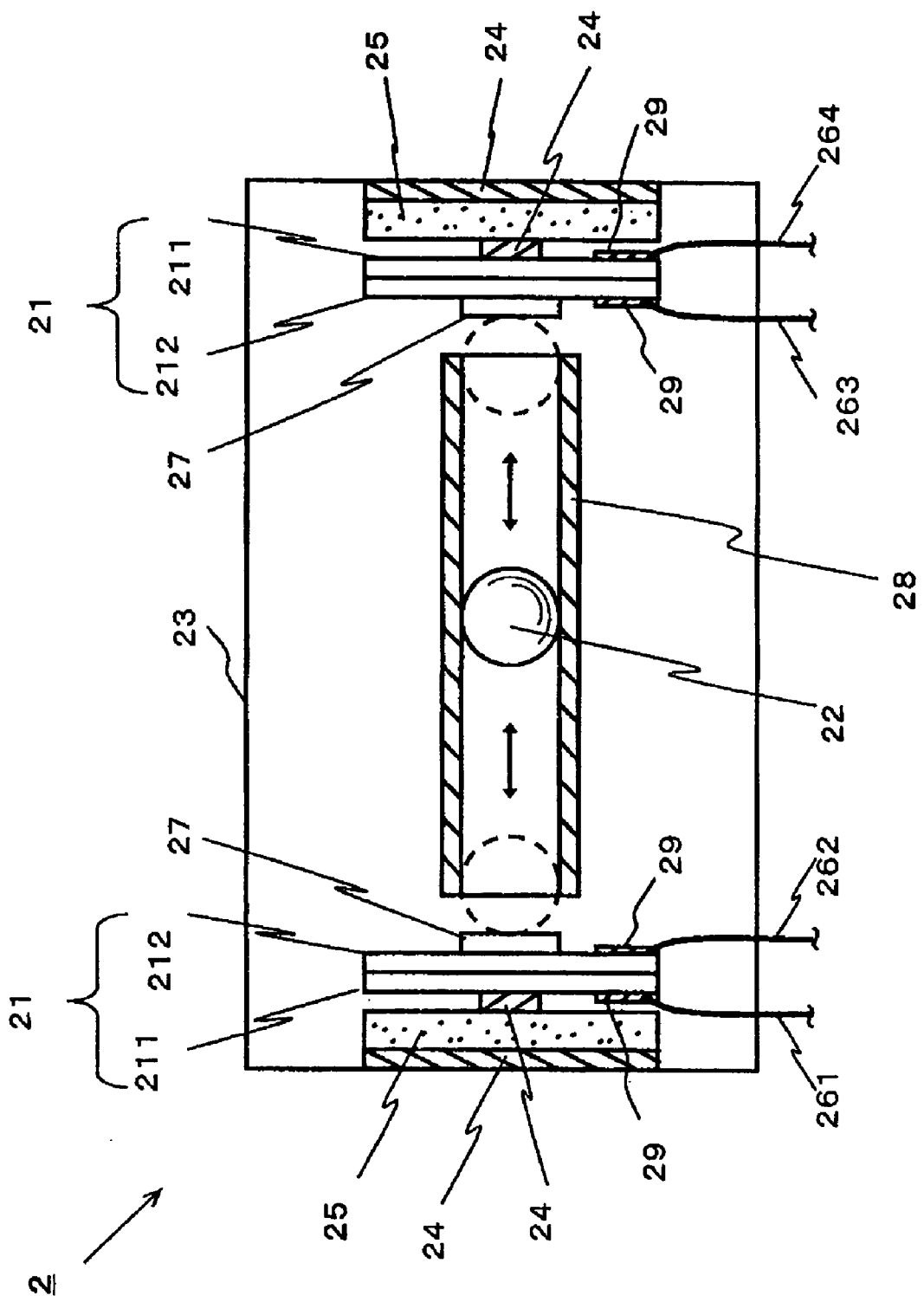
FIG. 4 is a sectional view showing a generating section in the first embodiment of the present invention.

FIG. 1 is a block diagram showing the first embodiment of the present invention, FIG. 2 is a block diagram showing in detail the same, FIG. 3 is a circuit diagram of the same, and FIG. 4 is a sectional view showing a generating section in the same embodiment.

The power source apparatus 1 in the first embodiment of the invention comprises the power generating section 2 for generating electricity by exerting a stress on the piezoelectric elements 21, and the charging section 3 for recharging therein with the electricity. The charging section includes a determination means 33 for determining whether the quantity of charged electricity reaches a prescribed level according to the timing of generating electricity in the piezoelectric elements 21.

That is, the power source apparatus 1 comprises the power generating section 2, the charging section 3, and an output section 4. The power generating section 2 is provided with the piezoelectric elements 21 and the collision member 22, which comes into collision with the piezoelectric elements 2 to cause strain in the piezoelectric elements 21, consequently to generate electricity in the piezoelectric elements 21.

The charging section 3 has a rectification means 31, charging means 32, and switching means 34 in addition to the determination means 33. The rectification means 31 serves to rectify electricity having the AC voltage output from the power generating section 2 into a pulsating current. The charging means 32 is charged with the pulsating current output as a direct current from the rectification means 31. The determination means 33 has functions of intermittently monitoring and determining the quantity of the charged electricity in the charging means 32 according to the timing of generating electricity in the piezoelectric elements. This determination means consumes a little bit of electricity to monitor the charged electricity, but can further reduce consumption of electricity due to the intermittent determination. When confirming that the quantity of charged electricity reaches a prescribed level, the switching means 34 brings the charging means 32 into discharge. The electricity discharged from the charging means is supplied to an external device connected through the output section 4.

The sections constituting the power source apparatus of the invention will be described hereinafter in detail with reference to FIG. 3 and FIG. 4.

The power generating section 2 has the piezoelectric elements attached to the opposite sides in a box-shaped housing 23, so as to permit the collision member 22 to roll between the piezoelectric elements and come into collision with the piezoelectric elements, as shown in FIG. 4. The collision member 22 is formed of a ball. As the piezoelectric elements 21, there have been used two plates 211 and 212 of PZT-piezoelectric ceramic, which are joined in reverse polarity, so that a serial power generating mechanism can be formed so as to prevent counteraction due to the piezoelectric polarization thereof. consequently to increase a power generation capacity thereof. Each piezoelectric element 21 is secured in part at its central part or both sides to a plate-like cushion member 25 with an adhesive 24 (or other fixing means) (the piezoelectric element is secured with the adhesive placed at the central part of the element in the case of FIG. 4). The cushion member 25 is fixed on a housing with an adhesive 24. Therefore, the piezoelectric ceramic plates 211 and 212 can sustain vibrational motion to increase the power generation efficiency and be protected from the impact of the collision of the collision member 22 with the piezoelectric element. On the both sides of the piezoelectric element 21, there are formed membranous electrodes 29 having lead wires 261–264 connected to the rectification means 31 disposed on the subsequent stage. The piezoelectric element 21 is provided on its front surface (with which the collision member 22 comes into collision) with a lamelliform protector 27 for protecting the piezoelectric element from the impact of the collision member 22. Between the opposed piezoelectric elements 21, there is disposed a guide 28 for controlling the direction of the rotating motion of the collision member 22 so as to bring the collision member 22 into accurate collision with the lamelliform protectors 27 attached to the piezoelectric elements. In this embodiment, the guide 28 is formed in a cylindrical shape, but may be of a parting plate member.

The piezoelectric ceramic plates 211 and 212 are preferably made of lead zirconate titanate, but the material of the piezoelectric element is not specifically limited thereto. Besides, it is desirable to make the piezoelectric ceramic plates 211 and 212 of as rigid material as possible having high Q-value to fulfill higher generation of electricity. To be more specific, the material having a Q-value of over 1000, preferably, over 2000, can be used suitably for the piezoelectric element. The cushion member 25 may be suitably made of soft materials such as synthetic resin and rubber or composite material formed like sponge of these soft materials. To be more specific, polyethylene foam can be suitably used for the cushion member. It is desirable to make the collision member 22 of material of heavy enough not to break the piezoelectric element 21 in order to increase the generating efficiency. To be more specific, there may be suitably used tungsten, steel or the like. The protector 27 may be suitably made of phosphor bronze, stainless steel or the like. Since the phosphor bronze shows a good processability, it is convenient for forming the protector.

The method for generating electricity by the power generating section 2 incorporating the piezoelectric elements 21 is by no means limited to that as described above. In the first embodiment, there are disposed the two piezoelectric elements 21 on the opposite surfaces in the power generating section 2 so as to allow the collision member 22 to roll therebetween and come into collision with the opposite piezoelectric elements. However, one or three or more piezoelectric elements may be used in place of the two piezoelectric elements 21. Alternatively, there may be used two collision members as described in Japanese Patent Application Public Disclosure No. 2001-145375 in place of the single collision member as above, or a collision member suspended by spring means. The piezoelectric element may be formed by bonding a single-layer piezoelectric ceramic plate 211 to a metal plate having a thickness adjusted for balance in strain deformation, so as to generate electricity by having the collision member collide with the piezoelectric element from the side of the metal plate. Alternatively, the power generating section may be modified such that the collision member 22 is omitted, and instead, the piezoelectric element is supported at both sides so as to generate electricity by being pressed. The piezoelectric element 21 may be fixed at one end so as to generate electricity by its free vibrations or vibrations in the form of other type of strain (e.g. wave-formed vibrations).

The rectification means 31 has a full-wave rectifying circuit composed of diodes D1–D6 as shown in FIG. 3, to rectify the alternating current from the power generating section and output the rectified current as a pulsating current to the subsequent stage. Of the lead wires 261–264 from the power generating section 2, the lead wires 262 and 263 are connected to each other. The connected lead wires and other lead wires are connected to the diodes D1–D6. Although the number of lead wires from the power generating section is reduced by connecting the lead wires 262 and 263 to each other in this embodiment, the full-wave rectifying circuit may be constructed by separately connecting the lead wires to eight diodes without connecting the lead wires 262 and 263.

The charging means 32 is provided with a capacitor C1, which may be replaced with a charging battery. While the pulsating current from the rectification means 31 is successively stored in the capacitor C1, the terminal voltage of the capacitor C1 is increased every time the collision member 22 comes in collision with the piezoelectric element to generate electricity The switching means 34 is a self-holding type current switch. The switching means in the first embodiment employs complementary transistors formed of a PNP transistor Tr1 and a NPN transistor Tr2. The switching means 34 is operated in such a manner that Tr1 is turned ON by applying a voltage lower than that at a point "c" by about 0.6V (which is determined by Tr1) to a point "b" in FIG. 3, and at about the same time, Tr2 is also turned ON. When the switching means 34 turns ON, impedance between the points "c" and "d" shown in FIG. 3 turns out to be very small. Then, the electricity charged in the capacitor C1 of the charging means 32 is discharged to be output to an external device through the output section 4 with an extremely small loss. The ON state is self-held until ceasing discharging.

The determination means 33 includes capacitors C2 and C3 and resistances R1 and R2. The capacitor C3 is provided for prevention of malfunction. The capacitor C2 and the resistance R1 are disposed between the point "a" through which the output from the piezoelectric element 21 flows and the point "b" of the switching means 34. Time for applying the voltage to the point "b" in determining the quantity of the electricity charged in the capacitor is determined with a time constant obtained herein. The alternating voltage occurs at the point "a" whenever the collision member 22 comes into collision with the piezoelectric element 21. This voltage corresponds to the sum of the interelectrode voltage of the capacitor C1 and the forward voltage of the diode D5. As the voltage increases due to charging into the capacitor C1, the alternating voltage at the point "a" increases. That is, the alternating voltage at the point "a", which is substantially proportional to the voltage of the direct current at the both electrodes of the capacitor C1, occurs intermittently whenever the collision member 22 comes into collision with the piezoelectric element. The alternating voltage at the point "a" is imposed on the point "b" for a very short time based on the time constant determined by the resistance R1 and capacitor C2. The voltage at the point "b" is determined according to the distribution ratio of the resistances R1 and R2, so that the switching means 34 turns ON when the voltage at the point "b" exceeds the voltage smaller than that at the point "c" by about 0.6V (which is determined by Tr1). The voltage at the point "b" is expressed by the equation [(Voltage at the point "c")$\times(1-R2/(R1+R2))$]. Consequently, the voltage lower than the voltage at the point "b" by about 0.6V (Voltage at the point "b"—about 0.6V) is determined as a threshold value of the switching means, with which the level of the charged quantity is measured. Thus, the charged level for initiating discharging can be arbitrarily set by adjusting R1 and R2. In this embodiment, the point "a" is placed on the side of the lead wire 264, but may be placed on the side of the lead wire 261 or lead wires 262 and 263 connected thereto. Of the two piezoelectric elements, the piezoelectric element 21 serves to make the determination with the generation of electricity in the illustrated embodiment, but both the piezoelectric elements 21 may have a function of making the determination. The determination may be made once every N-times the piezoelectric element 21 generates electricity (where N is an arbitrary number).

The output section 4 is provided with a connector and the like for connecting the apparatus to an external device. Namely, the electricity charged in the apparatus is output to the external device through the output section 4 at a burst.

The operation of the first embodiment described above will be described. First, when the power generating section 2 receives oscillating movement or other movement, the collision member 22 comes into collision with the piezoelectric element 21 to cause strain on the piezoelectric element 21, consequently generating alternating voltage. Since the power generating section 2 has the opposed piezoelectric elements 21, the generation of electricity can be efficiently carried out. The alternating power thus generated is rectified into a pulsating current by the rectification means 31 in the charging section 3 and charged in the form of a direct current into the charging means 32. The quantity of charged electricity in the charging means 32 gradually increases as the collision of the collision member 22 with the piezoelectric elements 21 are repeated.

The alternating voltage intermittently occurs at the point "a" every time the collision member 22 comes into collision with one of the piezoelectric elements 21. The alternating voltage at the point "a" increases with the increase of the quantity of electricity charged in the charging means 32. When the alternating voltage occurs at the point "a", voltage is imparted to the point "b" for a very short time based on the time constant determined by the resistance R1 and capacitor C2. When the voltage imparted to the point "b" becomes above the prescribed value, the switch means 34 turns ON and is kept in the self-holding state. Consequently, the electricity charged in the charging means 32 can be discharged to the external device at a burst.

When the electricity charged in the charging means 32 is consumed in the external device to reduced close to zero, the self-holding state of the switching means is automatically released, consequently to start charging in the charging means 32.

The determination means 33 in this embodiment makes intermittent determination of the quantity of charge at the timing of the collision of the collision member 22 with the piezoelectric element 21. When the quantity of charge exceeds the prescribed level, the switching means 34 turns ON to discharge the electricity charged in the charging means. That is, unless the collision member 22 comes into collision with the piezoelectric element 21, the determination of the quantity of charge is not made, thus to need little electricity to monitor the quantity of charge. The electricity charged in the charging means is discharged at a burst at the moment the electricity charged reaches the prescribed level, so that large electric power can be supplied to the external device.

As the external device to which the power source apparatus 1 according to the present invention is connected, there may be suitably applied electronic devices operating for a fixed period of time, such as high-intensity lights and LEDs.

Thus, the alternating voltage is produced from the electricity, which is obtained from the piezoelectric element 21 every time the collision member 22 comes into collision with the piezoelectric element 21, and utilized for determining whether or not the quantity of charged electricity in the charging means 32 reaches the prescribed level. The intermittent determination of the quantity of charge prevents wasting of electricity for monitoring the charged electricity, consequently to increase the charging efficiency of the charging means 32. Therefore, the power source apparatus of the invention can be used as a high-performance power source for an external device having need of relatively high electricity, even in case of employing inefficient piezoelectric elements 21.

Figure 5:
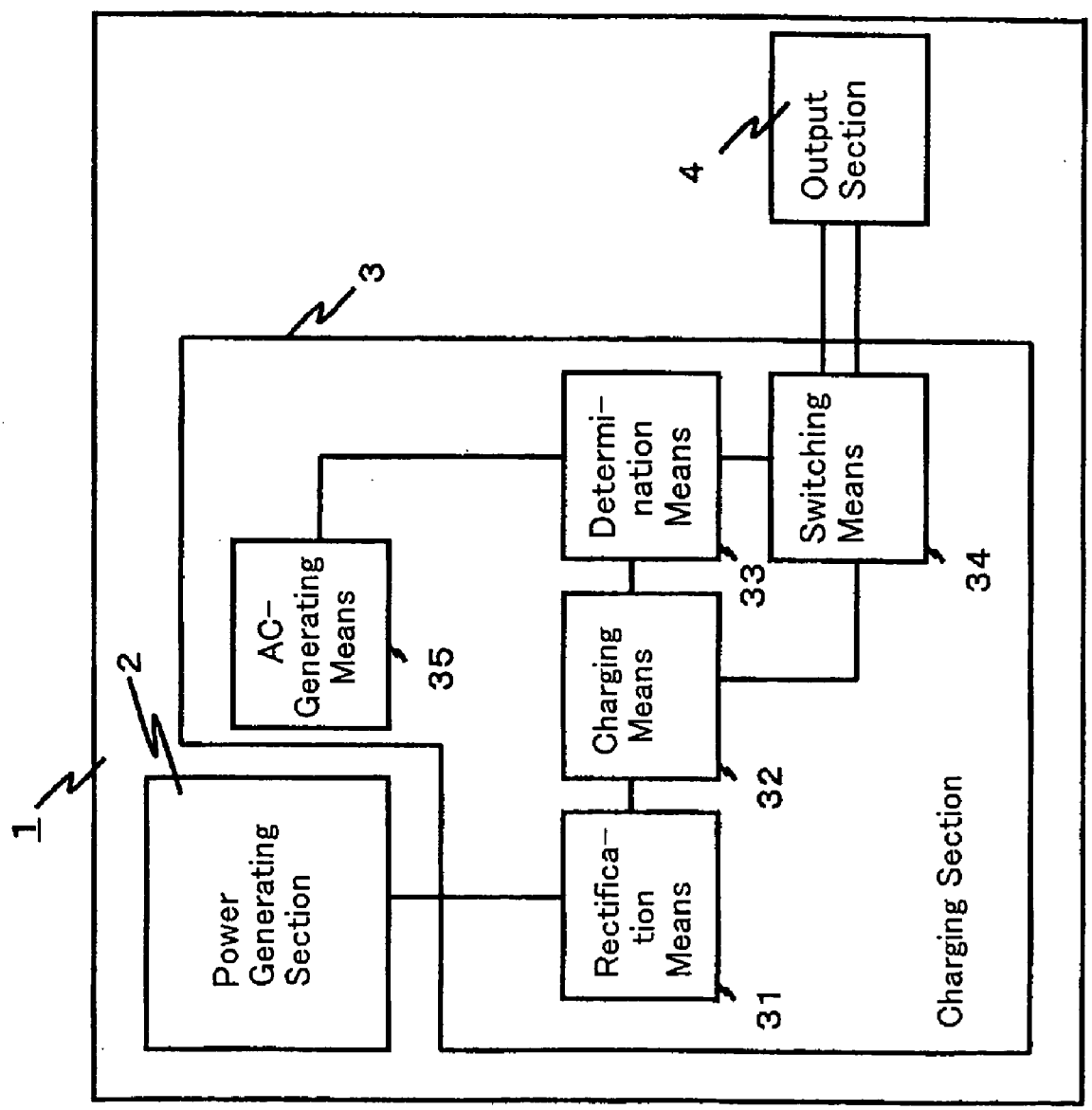
FIG. 5 is a block diagram showing a second embodiment of the present invention.
Figure 6:
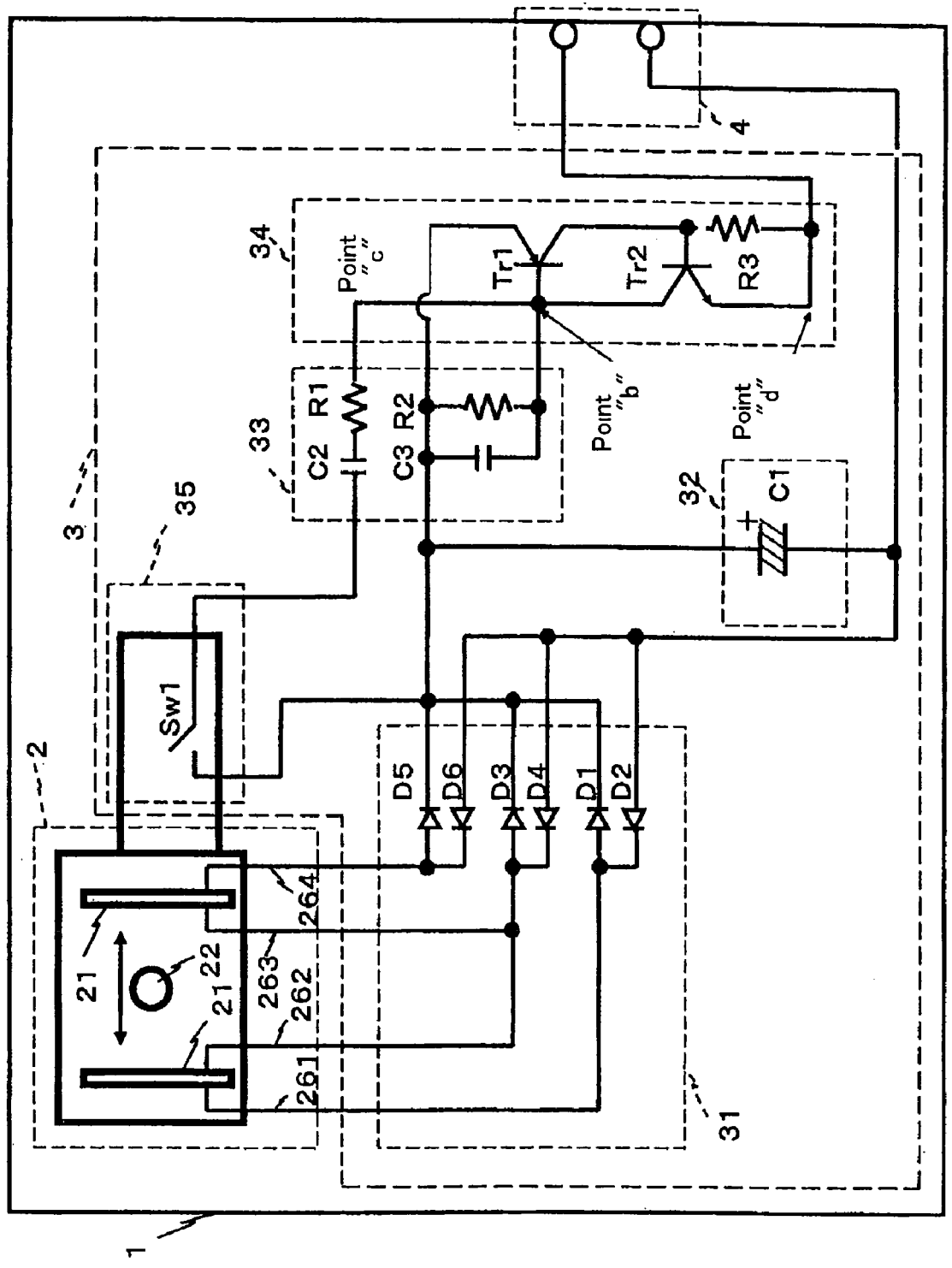
FIG. 6 is a circuit diagram of the second embodiment of the present invention.

Next, the second embodiment of the power source apparatus according to the present invention will be described with reference to the accompanying drawings. FIG. 5 is a block diagram showing in detail the second embodiment of the invention, and FIG. 6 is a circuit diagram of the second embodiment of the invention. Since the second embodiment of the invention is a modification of the first embodiment as described above, the component elements assigned by the same reference numerals as those in the first embodiment will not be described further here.

The alternating voltage, which is used at the point "a" for the determination means 33 of the power source apparatus in the first embodiment, is generated in the form of quasi-voltage in accordance with the quantity of charge to make the intended determination in the second embodiment.

The charging section 3 in the second embodiment includes a mechanical switch Sw1 as alternating-current generating means 35, which operates in cooperation with the power generating section 2. The mechanical switch Sw1 has two terminals, one connected to the capacitor C1 in the charging means 32 and the other connected to the capacitor C2 in the determination means 33. The mechanical switch Sw1 is turned on and off with the oscillating movement of the power generating section 2, consequently to intermittently send the interelectrode voltage of the capacitor C1 in the charging means 32 as a pseudo-AC voltage to the capacitor C2. In the meantime, the voltage is imposed to the point "b" for a very short time based on the time constant determined by the capacitor C2 and resistance R1. Then, when the voltage imposed to the point "b" exceeds the prescribed level, the switching means 34 is operated in the same manner as the first embodiment described above, thereby to discharge the discharging means 32.

Thus, the second embodiment can as well fulfill the operation and effect of the first embodiment by generating the pseudo-AC voltage.

Next, the power source apparatus in the third embodiment of the present invention will be described with reference to FIG. 7 showing, in section, the power generating section. Since the third embodiment of the invention is a modification of the first embodiment as described above, the component elements assigned by the same reference numerals as those in the first embodiment will not be described further here.

The third embodiment is featured by the power generating section 20 having the piezoelectric elements 21 connected in parallel, differently from the first embodiment in which the piezoelectric elements 2 are connected in series. Each piezoelectric element 21 has two piezoelectric ceramic plates 211 and 212 joined to each other in the same direction in polarization. An electrode 292 is united to between the piezoelectric ceramic plates 211 and 212. The electrode 292 looks larger than the actual thickness in the illustration of FIG. 7 for easier comprehension, but it is made of metal plate of very thin (about 10 to 50 $\mu$m) in fact and, preferably, material encountering little mechanical resistance in causing strain on the piezoelectric element 21. To be more specific, the electrode may preferably be made of phosphor bronze, brass or the like. Onto the outside surfaces of the piezoelectric ceramic plates 211 and 212, which are opposite to the surfaces joined to the electrode 292, there are attached electrodes 291. To each electrode 292, a lead wire 262 (264) is connected, and to each electrode 291, a lead wire 261 (263) is connected. These lead wires are connected to the subsequent stage in the same manner as shown in FIG. 3. Other components are identical with those in the first embodiment described above.

The parallel-type power generating system having the piezoelectric elements connected in parallel as noted above has the power generation efficiency about twice as high as that of the serial-type system having the piezoelectric elements connected in series. That is, this parallel-type power generating system applied for charging a capacitor has an efficient capacitance capable of discharging electricity as much as the serial-type power generating system with half the driving energy required for operating the serial-type power generating system.

Although the power source apparatus 1 in each of the first to third embodiments is configured so as to be connected to the external device by way of example, it may of course be incorporated as a power source means in any electronic devices.

INDUSTRIAL APPLICABILITY

The power source apparatus according to the present invention has an advantageous feature capable of determining electricity generated by the piezoelectric elements and charged in the charging means according to the timing of generating electricity in the piezoelectric elements. Therefore, determination whether the quantity of electricity charged in the charging means reaches the prescribed level can be made intermittently with high efficiency according to the timing of increasing the charged electricity, but not carried out consecutively. As a result, more electricity can be charged without wasting of electricity for monitoring and determining the charged electricity.

Since the power source apparatus of the invention has the switching means for impeding discharging from starting until a determination whether the quantity of charged electricity reaches the prescribed level is made, the electricity charged to the required quantity in the charging means can be discharged at a burst. Thus, even the power source apparatus using the piezoelectric elements can be used as a power source for an external device having need of high power and applied to a broad range of equipment or devices.

What is claimed is:

1. A power source apparatus comprising a power generating section for generating electricity by exerting a stress on piezoelectric elements, and a charging section for recharging therein with the electricity, which charging section includes a determination means for determining whether the quantity of charged electricity reaches a prescribed level according to the timing of generating electricity in said piezoelectric elements.

2. The power source apparatus according to claim 1, wherein said charging section includes switching means for impeding discharging from starting until a determination whether the quantity of charged electricity reaches the prescribed level is made.

3. The power source apparatus according to claim 1, wherein said power generating section includes a collision member coming into collision with the piezoelectric elements, and said determination means makes the determination whether the quantity of charged electricity reaches a prescribed level according to the timing of generating electricity in said piezoelectric elements.

4. The power source apparatus according to claim 1, wherein said determination means makes the determination by using alternating current output from said piezoelectric element in generation of electricity.

5. The power source apparatus according to claim 2, wherein said determination means makes the determination by using alternating current output from said piezoelectric element in generation of electricity.

6. The power source apparatus according to claim 3, wherein said determination means makes the determination by using alternating current output from said piezoelectric element in generation of electricity.

7. The power source apparatus according to claim 1, wherein said determination means makes the determination by using alternating current generated in a pseudo-manner and having the voltage proportional to the quantity of charge in said charging section.

8. The power source apparatus according to claim 2, wherein said determination means makes the determination by using alternating current generated in a pseudo-manner and having the voltage proportional to the quantity of charge in said charging section.

9. The power source apparatus according to claim 3, wherein said determination 5 means makes the determination by using alternating current generated in a pseudo-manner and having the voltage proportional to the quantity of charge in said charging section.

10. The power source apparatus according to claim 2, wherein said power generating section includes a collision member coming into collision with the piezoelectric elements, and said determination means makes the determination whether the quantity of charged electricity reaches a prescribed level according to the timing of generating electricity in said piezoelectric elements.

* * * * *